Nov. 30, 1926. Re. 16,493
J. CARLSON
ADJUSTABLE SKATE
Original Filed Jan. 17, 1924
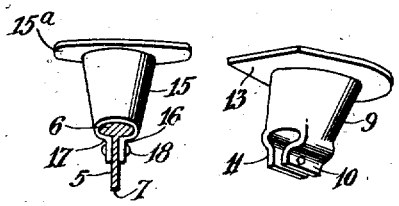
FIG. 3.
FIG. 4.
FIG. 1.
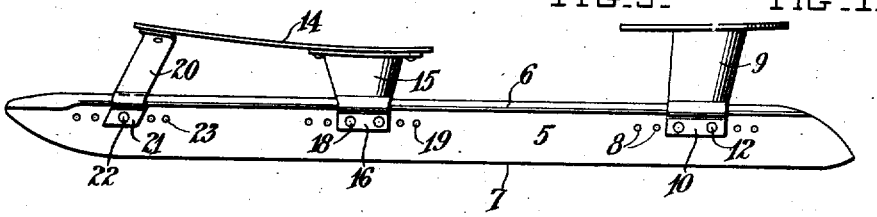
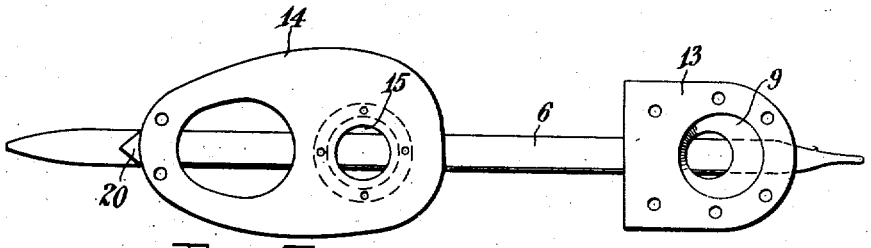
FIG. 2.
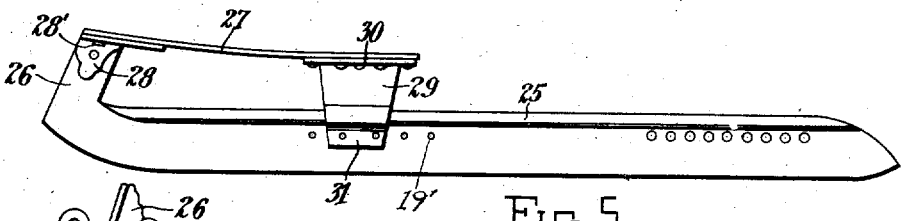
FIG. 5.
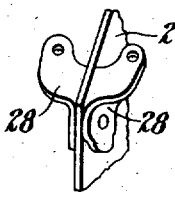
FIG. 6.
Inventor
JOHN CARLSON
By his Attorneys
Redding, Greeley, O'Shea & Campbell Reissued Nov. 30, 1926. Re. 16,493

UNITED STATES PATENT OFFICE.

JOHN CARLSON, OF SPRINGFIELD, MASSACHUSETTS.

ADJUSTABLE SKATE.

Original No. 1,583,277, dated May 4, 1926, Serial No. 686,756, filed January 17, 1924. Application for reissue filed October 2, 1926. Serial No. 139,212.

This invention relates to improvements in ice skates and its leading object is to provide a skate with a rigid one piece runner or blade and a shoe support capable of being connected to the runner or blade in various longitudinal positions to fit various persons.

Another object of the invention is the provision of a runner blade for skates with a supporting head which is of greater width than the blade to afford lateral shoulders of large superficial bearing area to facilitate securing the support thereto.

A further object is to provide an improved shoe support which is tubular and has flexible depending jaws to embrace the enlarged head and extend below it for attachment to the runner.

With the above and other objects in view the invention consists in certain new and useful constructions, combinations and arrangements of parts, clearly described in the following specification and fully illustrated in the accompanying drawings, in which:

Figure 1 is a side elevation of one form of my invention.

Figure 2 is a plan view thereof.

Figure 3 is a transverse sectional view.

Figure 4 is a detail perspective view of one of the shoe supporting devices or cups detached from the runner.

Figure 5 is a side elevation of the modified form of the invention.

Figure 6 is a detail view in perspective of a foot plate connection.

Referring to the accompanying drawings illustrating the practical embodiment of my invention 5 designates a runner blade which is preferably made with a T-shaped head 6, and a straight edge 7 for engaging the ice. The forward end of the runner blade 5 is curved upwardly and forwardly and is also, on its upper side, curved forwardly and downwardly. The rear end of the blade is curved rearwardly and downwardly and slightly upwardly and rearwardly on its lower side.

The rear end of the runner blade 5 is provided with a series of longitudinally spaced openings 8, located under the T-shaped head thereof and in parallel relation therewith. The tubular heel supporting cup 9 is adjustably connected with the rear end portion of the blade by means of depending flexible clamping jaws 10 and 11 formed on the base of said cup, which are shaped to snugly fit the T-shaped head of the runner blade. Through these jaws the rivets 12 are extended after the required longitudinal adjustment has been made, and are then clinched or headed in fixed position, so as to firmly hold the heel supporting cup on the runner blade. This heel supporting cup is formed with an attaching head flange 13, whereby the cup may be connected positively to the heel portion of a skating shoe.

The toe supporting plate 14 is connected at its rear end to the supporting cup 15, the base of which is formed with flanges or clamping jaws 16 and 17, which are shaped to snugly grip the T-shaped head of the runner blade. These jaws are adjustably connected with the runner blade through rivets 18 which may be extended through the series of holes 19 formed in the blade 5 immediately below the T-shaped head thereof and in parallel relation thereto. The cup 15 is provided with an integral flange 15[a] on its head which is riveted or otherwise connected directly to the foot plate 14. The forward portion of the foot or toe plate 14 is supported by means of the angle brace 20, which is connected by rivets or the like at its upper end to the forward end of the toe plate, and at its lower end to the T-shaped head of the runner blade; said lower end being formed with clamping jaws 21, which are shaped to snugly grip the T-shaped head of the runner blade, and which are connected to the blade 5 by means of one or more rivets 22 extended through one of the series of holes 23 formed in the runner blade immediately below the T-shaped head thereof. The brace 20 could be formed integral with the toe or foot plate if desired.

In Figures 5 and 6 I show a modified form of the runner and the supporting connection for the forward end of the toe or foot plate, consisting of a runner blade 25 which is provided with an upstanding integral arm 26 to which the forward end of the foot plate 27 is connected by means of the brackets 28, said foot plate being connected to the brackets by screws 28′, shown in perspective in Figure 6.

The rear end of the toe or foot plate 27 is supported by the cup 29, the head of which is provided with a flange 30 which is riveted or otherwise directly connected to the foot plate and the base of which is bifurcated to provide clamping jaws 31, which are riveted or bolted directly to the runner blade. A series of holes 19′ in the blade permits these jaws to be adjustably connected therewith.

By means of my invention a single runner blade can be used for various sizes of skating shoes, by simply varying the connection between the blade and the supporting member.

The ice engaging and wear resisting straight edge may be tempered glass hard and the T-shaped head given a lower temper, so that the edge will maintain a smooth running action and the head will not be brittle and will resist bending and distortion.

The cups are preferably drawn with tapered walls, so as to give great strength.

The runner blade may be drawn or drop forged from T-shaped iron or steel, and its ends and edges ground to give the required accuracy.

Having described my invention I claim:

1. An ice skate consisting of a runner blade having an integral T-shaped longitudinal head, and a shoe provided with separated jaws adjustably clamped to the T-shaped head.

2. An ice skate having a runner blade provided with an integral T-shaped head and an upstanding integral arm, and a toe plate having connection with said arm and provided with a support at its rear end having clamping jaws straddling the T-shaped head and positively connected thereto.

3. An ice skate comprising a runner having a blade providing a rigid bearing edge and an integral stiffening head of greater width than the blade providing lateral shoulders on the opposite sides of the blade and shoe supporting means provided with pendant separated jaws clamped directly to the blade and having interlocking engagement with the head by correspondingly shaped portions.

4. An ice skate comprising a runner having an integral stiffening head of greater width than the blade providing lateral shoulders and a shoe supporting member consisting of a cup having an attaching flange on its upper end and pendant jaws shaped to snugly fit the head, the cup being mounted on the head and the jaws being secured to the sides of the runner below said head.

5. An ice skate comprising a runner having an integral stiffening head providing lateral shoulders and a shoe supporting member consisting of a cup having an attaching flange on its upper end and flexible pendant jaws shaped to snugly fit the head, the cup being mounted on the head and the jaws being secured to the sides of the runner below said head.

6. An ice skate comprising a runner having an integral stiffening head providing lateral shoulders and a shoe supporting member consisting of a tubular cup having an attaching flange on its upper end and flexible pendant jaws integral therewith shaped to snugly fit the head, the cup being mounted on the head and the jaws being secured to the sides of the runner below said head.

This specification signed this 8th day of September, A. D. 1926.

JOHN CARLSON.